United States Patent
Miles et al.

(10) Patent No.: US 9,764,375 B2
(45) Date of Patent: Sep. 19, 2017

(54) FRICTION BIT JOINING OF MATERIALS USING A FRICTION RIVET

(71) Applicants: MEGASTIR TECHNOLOGIES LLC, Provo, UT (US); Brigham Young University, Provo, UT (US)

(72) Inventors: Michael P. Miles, Springville, UT (US); Rodney Dale Fleck, Mansfield, TX (US); Russell J. Steel, Salem, UT (US)

(73) Assignees: Brigham Young University, Provo, UT (US); Megastir Technologies LLC, Provo, UT (US)

( * ) Notice: Subject to any disclaimer, the term of this patent is extended or adjusted under 35 U.S.C. 154(b) by 25 days.

(21) Appl. No.: 14/153,814

(22) Filed: Jan. 13, 2014

(65) Prior Publication Data

US 2014/0123470 A1    May 8, 2014

Related U.S. Application Data

(63) Continuation-in-part of application No. 13/783,740, filed on Mar. 4, 2013, now abandoned.

(60) Provisional application No. 61/606,218, filed on Mar. 2, 2012.

(51) Int. Cl.
| | |
|---|---|
| *B23K 20/12* | (2006.01) |
| *B21J 15/00* | (2006.01) |
| *B21J 15/10* | (2006.01) |

(52) U.S. Cl.
CPC .......... *B21J 15/10* (2013.01); *B23K 20/127* (2013.01); *B23K 20/1215* (2013.01); *B23K 20/1255* (2013.01); *B23K 20/1265* (2013.01); *Y10T 29/49956* (2015.01); *Y10T 29/5377* (2015.01)

(58) Field of Classification Search
None
See application file for complete search history.

(56) References Cited

U.S. PATENT DOCUMENTS

| | | | |
|---|---|---|---|
| 3,298,725 A | * | 1/1967 | Boteler ............. B61F 5/26 403/282 |
| 3,477,115 A | | 11/1969 | Martin et al. |
| 5,248,077 A | | 9/1993 | Rhoades |

(Continued)

FOREIGN PATENT DOCUMENTS

| | | |
|---|---|---|
| CN | 101817142 | 9/2010 |
| DE | 102011114306 | 3/2013 |
| JP | 2013148122 | 8/2013 |

OTHER PUBLICATIONS

U.S. Appl. No. 61/606,218, filed Mar. 2, 2012, Higgins, et al.
(Continued)

*Primary Examiner* — Devang R Patel
(74) *Attorney, Agent, or Firm* — Ray Quinney & Nebeker, P.C.; Paul N. Taylor

(57) ABSTRACT

A system and method of joining at least two workpieces together using a friction rivet and a friction rivet cap that are friction stirred together after a cutting tip or cutting feature on the friction rivet cuts through workpieces and is then bonded to the friction rivet cap, and wherein the friction rivet cap may be excluded if the friction rivet includes a hollow in the cutting tip, the hollow being flared after the friction rivets cuts through the workpieces to thereby create an integral rivet cap in the end of the friction rivet.

19 Claims, 13 Drawing Sheets

(56) References Cited

U.S. PATENT DOCUMENTS

| | | | |
|---|---|---|---|
| 6,213,379 B1 * | 4/2001 | Takeshita et al. | 228/112.1 |
| 6,227,433 B1 | 5/2001 | Waldron et al. | |
| 6,230,958 B1 | 5/2001 | Coletta et al. | |
| 6,554,177 B2 | 4/2003 | Foster | |
| 6,702,535 B1 * | 3/2004 | Stevenson | B21J 15/02 29/525.14 |
| 6,722,556 B2 | 4/2004 | Schilling | |
| 6,742,697 B2 * | 6/2004 | McTernan et al. | 228/112.1 |
| 6,883,699 B2 * | 4/2005 | Stevenson | B23K 20/122 228/112.1 |
| 6,983,831 B2 * | 1/2006 | Beri | 188/250 B |
| 7,347,641 B2 * | 3/2008 | Prichard | B21J 15/02 29/524.1 |
| 7,726,541 B2 * | 6/2010 | Maciel | B23K 20/122 228/112.1 |
| 7,743,961 B2 | 6/2010 | Maruko | |
| 7,845,545 B2 | 12/2010 | Packer et al. | |
| 7,954,692 B2 * | 6/2011 | Fukuda | B21J 5/063 228/112.1 |
| 2002/0125297 A1 * | 9/2002 | Stol et al. | 228/112.1 |
| 2003/0096336 A1 | 5/2003 | Soderlund et al. | |
| 2005/0178817 A1 | 8/2005 | Takase | |
| 2006/0006211 A1 | 1/2006 | Loitz et al. | |
| 2006/0024145 A1 * | 2/2006 | Wang et al. | 411/34 |
| 2008/0006678 A1 * | 1/2008 | Packer et al. | 228/114.5 |
| 2013/0228612 A1 | 9/2013 | Higgins et al. | |

OTHER PUBLICATIONS

U.S. Appl. No. 13/783,740, Apr. 25, 2014, Office Action.
International Search Report of PCT/US2015/01113, Mailed Jul. 14, 2015.

* cited by examiner

FRICTION BIT JOINING OF MATERIALS USING A FRICTION RIVET

BACKGROUND OF THE INVENTION

Field of the Invention

This invention relates generally to friction stir joining methods. More specifically, the present invention is a system and method of joining workpieces together using a friction stir tool that has at least a partially consumable pin or bit, wherein the bit may have a cutting edge that cuts through a first workpiece material when rotated at a first speed. After cutting through the first workpiece material to a sufficient depth, the rotational speed of the tool may be changed to cause plasticization of the bit itself, as well as the first workpiece material that is being joined to a second workpiece material. After sufficient heating of the first and second workpiece materials and the bit by the friction stir tool, the rotation of the tool may be rapidly decelerated or stopped completely to enable solid state bonding of the bit and the first and second workpiece materials. This process will be referred to throughout this document as friction bit joining, wherein the bit is a modified pin or rivet throughout this document.

Description of Related Art

There are many methods for joining metal workpieces together; some of which include welding, spot welding, fasteners (such as screws and bolts), friction stir welding, etc. The three fundamental principles that govern all joining methods include mechanical attachment, fusion joining (welding), and solid state joining (friction welding). Each principle technique has advantages; however the method often selected for an application is dictated by the one having the fewest tolerable disadvantages.

Examples of mechanical workpiece joining methods include screws, nuts and bolts, dovetail, swaging, riveting, interference attachment, etc. Many applications cannot use screws or bolts because the threads have limiting load carrying capability, the high cost of multiple components and assembly, the cost of the hole that must be placed in the workpieces and/or the space required for the fasteners. Dove tail and other workpieces locking methods lock in specified directions but can slide or rotate apart in other directions. Rivets have perhaps the greatest joining strength per unit area and volume of any mechanical fastener but the mechanical deformation of the rivet head reduces the energy absorbing capability as well as elongation.

When mechanical methods are not acceptable joining techniques, fusion welding methods are utilized unless the workpiece are not considered weldable. For example, aircraft components made from 7000 series aluminum are not considered weldable because the resulting weld strength is as low as 50% of base metal properties. High melting temperature materials (HMTM) such as steel, stainless steel and nickel base alloys can be welded but the joint strength is limited to problems associated with fusion welding. These problems include, but are not limited to, solidification defects, hard/soft zones within the weld macrostructure, residual stresses resulting from liquid to solid phase transformation, porosity, cracking, non-uniform and unpredictable microstructures, corrosion susceptibility, workpiece deformation, and loss of workpiece base material properties.

Post weld operations are often needed to repair distortion or evaluate the weld nondestructively and add cost to the process. In addition, there are health issues related to hexavalent chromium and manganese exposure as well as potential retina damage to the operator if proper safety procedures are not followed. In many cases, workpieces must be increased in size to use a base material of lower strength that is considered weldable in favor of a higher strength material that is not considered weldable. This is the case with automobile car bodies that are currently manufactured from lower strength steels. Advanced high strength steels (Dual Phase and TRIP steels) could be used in the frame construction to dramatically lower vehicle weight but these materials have not been used because of fusion weldability issues.

Friction stir welding is a solid state welding process that has many advantages over fusion welding methods. FIG. 1 is a perspective view of a tool being used for friction stir welding that is characterized by a generally cylindrical tool 10 having a shoulder 12 and a pin 14 extending outward from the shoulder. The pin 14 is rotated against a workpiece 16 until sufficient heat is generated, at which point the pin of the tool is plunged into the plasticized workpiece material. The workpiece 16 is often two sheets or plates of material that are butted together at a joint line 18. The pin 14 is plunged into the workpiece 16 at the joint line 18. Although this tool has been disclosed in the prior art, it will be explained that the tool can be used for a new purpose.

It is noted that the terms "workpiece" and "base workpiece material" may be used interchangeably throughout this document.

The frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that may be generally indistinguishable from the workpiece material 16 itself, in comparison to other welds.

It is observed that when the shoulder 12 contacts the surface of the workpiece, its rotation creates additional frictional heat that plasticizes a larger cylindrical column of material around the inserted pin 14. The shoulder 12 provides a forging force that contains the upward metal flow caused by the tool pin 14.

During FSW, the area to be welded and the tool are moved relative to each other such that the tool traverses a desired length of the weld joint. The rotating FSW tool provides a continual hot working action, plasticizing metal within a narrow zone as it moves transversely along the base metal, while transporting metal from the leading face of the pin to its trailing edge. As the weld zone cools, there is typically no solidification as no liquid is created as the tool passes. It is often the case, but not always, that the resulting weld is a defect-free, re-crystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Previous patent documents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

The previous patents teach that a tool is needed that is formed using a material that has a higher melting temperature than the material being friction stir welded. In some embodiments, a superabrasive was used in the tool.

It is also noted that the phrase "friction stir processing" may also be referred to interchangeably with "solid state processing". Solid state processing is defined herein as a temporary transformation into a plasticized state that typically does not include a liquid phase. However, it is noted that some embodiments allow one or more elements to pass through a liquid phase, and still obtain the benefits of the present invention.

In friction stir processing, a tool pin is rotated and plunged into the material to be processed. The tool is moved transversely across a processing area of the material. It is the act of causing the material to undergo plasticization in a solid-state process that can result in the material being modified to have properties that are different from the original material.

Friction stir spot welding (FSSW) is now being used experimentally to join advanced high strength steels in lap welding configurations. FSSW is being used commercially to lap weld aluminum components as described in US Patent application 20050178817. Two approaches are currently used.

The first approach involves plunging a pin tool (a FSSW tool comprised of a pin and a shoulder) into workpieces until the workpieces are spot friction welded together. The disadvantage with this method is the hole 26 left behind from the pin as shown in FIG. 2. The bond between the workpieces 28 is achieved under the shoulder of the tool while the pin hole reduces the strength of the weld.

A second method involves the design of equipment to force material back into the pin hole (U.S. Pat. No. 6,722,556). This method is quite cumbersome because of the large spindle head, fixturing requirements, and loads needed to make a spot weld.

The embodiments of the present invention are generally concerned with these functionally unweldable materials, as well as the superalloys, and are hereinafter referred to as high melting temperature materials (HMTM) throughout this document. However, the principles of the present invention are also applicable to lower melting temperature materials such as aluminum and other metals and metal alloys that are not considered part of the high melting temperature materials.

Recent advancements in friction stir welding technologies have resulted in tools that can be used to join high melting temperature materials such as steel and stainless steel together during the solid state joining processes of friction stir welding.

As explained previously, this technology involves using a friction stir welding tool that may include a polycrystalline cubic boron nitride (PCBN) tip. Other designs of this tool are also shown in the prior art, and include monolithic tools and other designs.

When this special friction stir welding tool is used, it is effective at friction stir welding of various materials. This tool design is also effective when using a variety of tool tip materials besides PCBN and PCD (polycrystalline diamond). Some of these materials include refractories such as tungsten, rhenium, iridium, titanium, molybdenum, etc.

It would be an advantage over the state of the art in the joining of metal workpieces to be able to provide a system and method that may use a partially consumable tool to perform FSSW using a consumable bit in a rapid and economical manner.

BRIEF SUMMARY OF THE INVENTION

A method of friction bit joining of at least two workpieces, wherein the invention is a system and method of joining at least two workpieces together using a friction rivet and a friction rivet cap that are friction stirred together after a cutting tip on the friction rivet cuts through workpieces and is then bonded to the friction rivet cap, and wherein the friction rivet cap may be excluded if the friction rivet includes a hollow in the cutting tip, the hollow being flared after the friction rivets cuts through the workpieces to thereby create an integral rivet cap in the end of the friction rivet.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
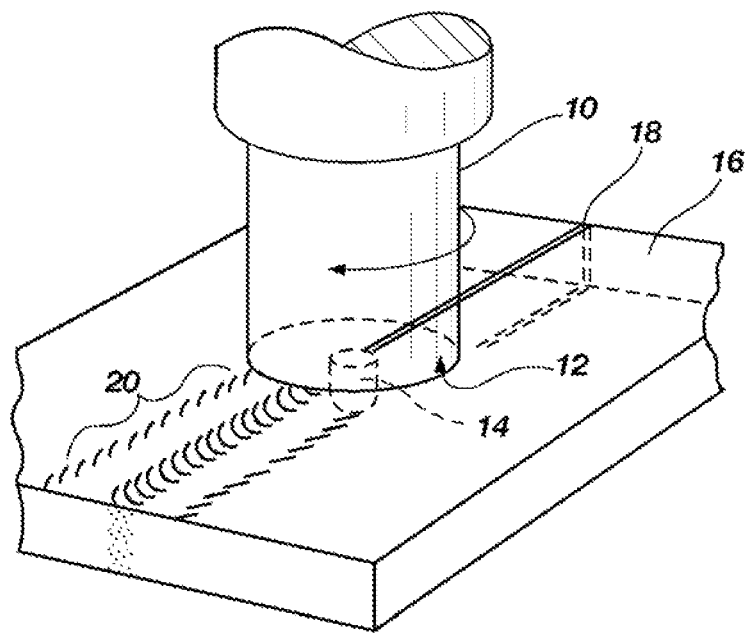
FIG. 1 is a prior art perspective view of an existing friction stir welding tool capable of performing friction stir welding on high melting temperature materials.
Figure 2:
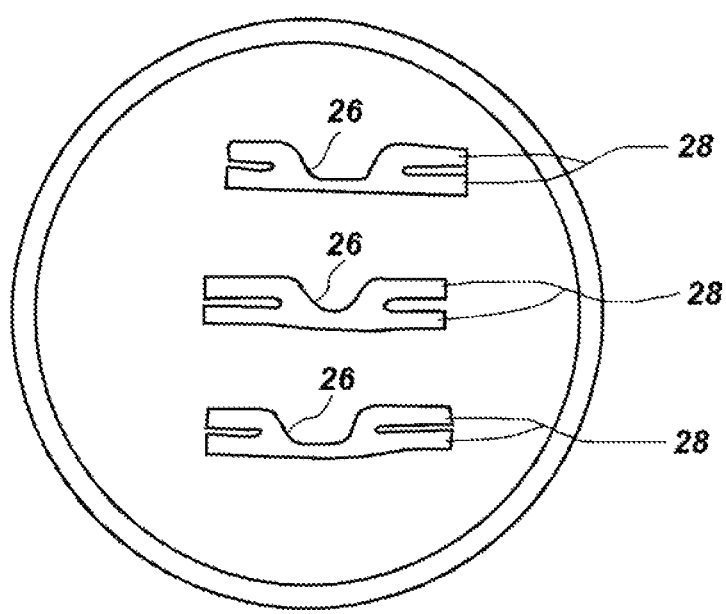
FIG. 2 is a profile view of three welds performed using friction stir spot welding (FSSW) as done in the prior art.
Figure 3:
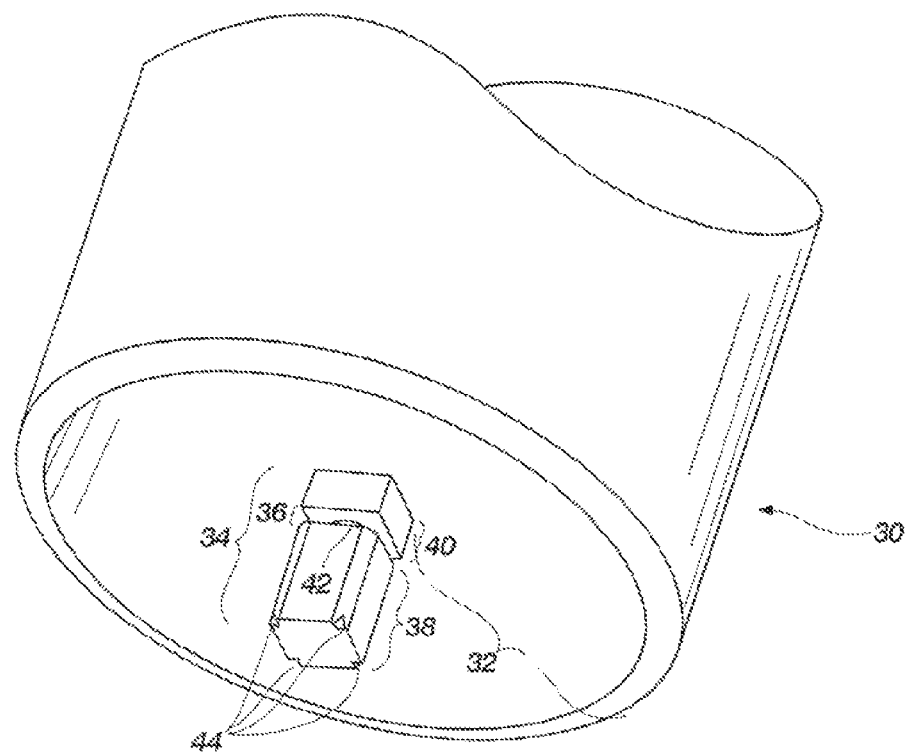
FIG. 3 is a perspective view of a rotational tool that is constructed in accordance with the principles of the prior art that can perform fiction stir bit joining.

The prior art teaches a rotating friction stirring tool having a non-consumable shoulder combined with a detachable and at least partially consumable bit that forms the basis of a friction bit joining method. The bit may be totally consumable or partially consumable. FIG. 3 is an illustration of how the prior art teaches that the friction stirring tool may be constructed.

FIG. 3 is a perspective illustration of the prior art that shows a friction bit joining tool 30 having a shoulder area 32 and a detachable and at least partially consumable bit 34. The bit 34 may also function as a rivet, but is generally referred to as a bit throughout this document. In this particular friction bit joining tool 30, a detachable and at least partially consumable bit 34 includes a small gap 36. A much smaller bit diameter portion 42 of the bit 34 forms the small gap 36. This small bit diameter portion 42 of the bit 34 is caused to break. The small gap 36 enables the detachable portion 38 of the bit 34 to remain embedded within the workpieces as a bit. It is also noted that the non-detached portion 40 of the bit 34 might also be the top of another bit segment as will be explained.

Figure 4:
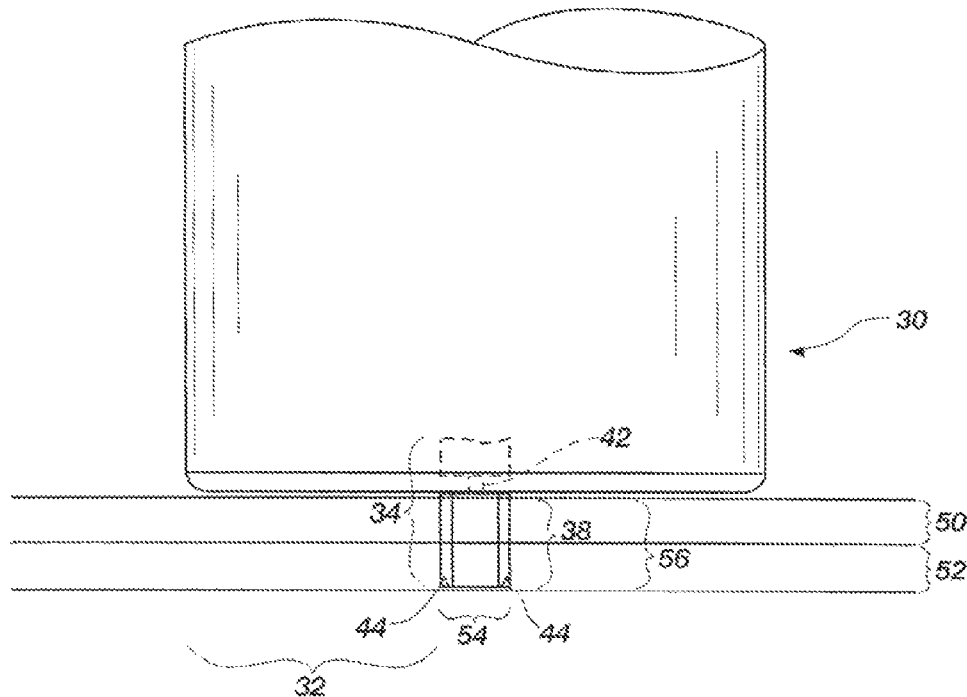
FIG. 4 is a profile view of the tool of FIG. 3 wherein the consumable bit has fully penetrated two workpieces.

FIG. 4 is also an illustration of the prior art and showing how to friction bit join (also known as "friction stir riveting") steel or another metal. The friction bit joining tool 30 is rotated at a speed that allows the bit 34 of the tool to machine or cut a first workpiece material 50 away to form a hole 54 therein. Features were added to the end of the bit 34 to facilitate machining the desired hole. For example, a cutting feature 44 is shown in FIG. 4.

Figure 5:
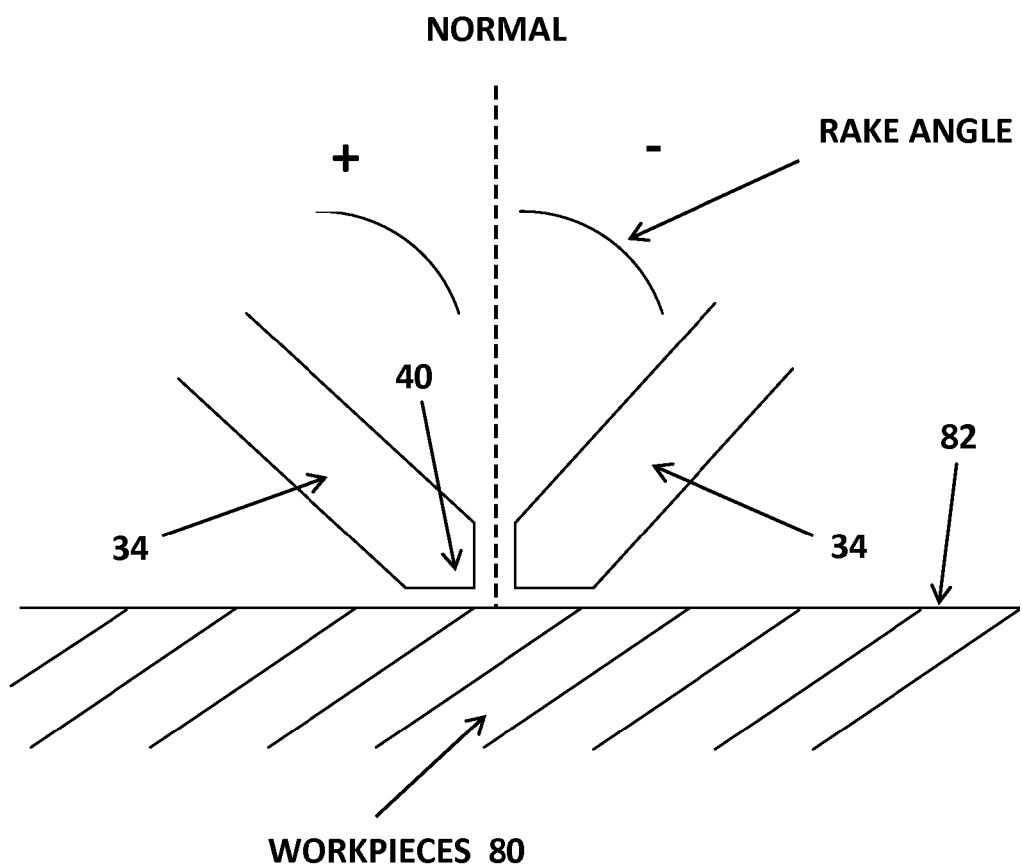
FIG. 5 is a profile view showing that the bit of the friction stir joining tool may operate at rake angles that are not normal to a workpiece surface.

The present invention improves upon the prior art by teaching that the bit of the friction bit joining tool may cut into the workpieces at an angle. A first aspect of the first embodiment of the present invention is shown in FIG. 5. The first embodiment is directed to improving the use of friction bit joining tools when performing friction bit joining. The first embodiment teaches that a modified angle may be used for the friction bit joining tool 30.

The prior art teaches cutting into the workpiece at an angle that is normal to the workpiece, as shown in FIG. 4. In contrast, the present invention teaches that the bit 34 on the friction bit joining tool may be able to enter the workpieces 80 at a positive or negative rake angle. The rake angle may be positive or negative without breaking the friction bit joining tool or prematurely breaking off the bit 34. The rake angle may be anywhere from +45 degrees to −58 degrees and be within the limitations of the present invention. While the rake angle may vary between the indicated angles, the preferred rake angle of the bit 34 may be between plus or minus 7 degrees of normal.

The first embodiment also addresses other angles of operation. The angle that is formed by a working surface 82 of the workpieces 80 and the working end 40 or bottom relief angle of the bit 34, may be anywhere between zero and 63 degrees. The cutting surface of the bit 34 may have a clearance relief of zero to 53 degrees.

The bit 34 may be characterized as a drill bit when it is used to cut into the workpieces. It has been determined that the bit 34 may have an outside cutting surface having a margin with relief.

The cutting features that may be used on the first embodiment of the bit 34 may be considered to include the Hosoi drill geometry with a helical cutting edge on the working end of the bit, but this should not be considered to be a limiting factor. Other cutting feature geometries may also be considered to be within the scope of the present invention.

Figure 8:
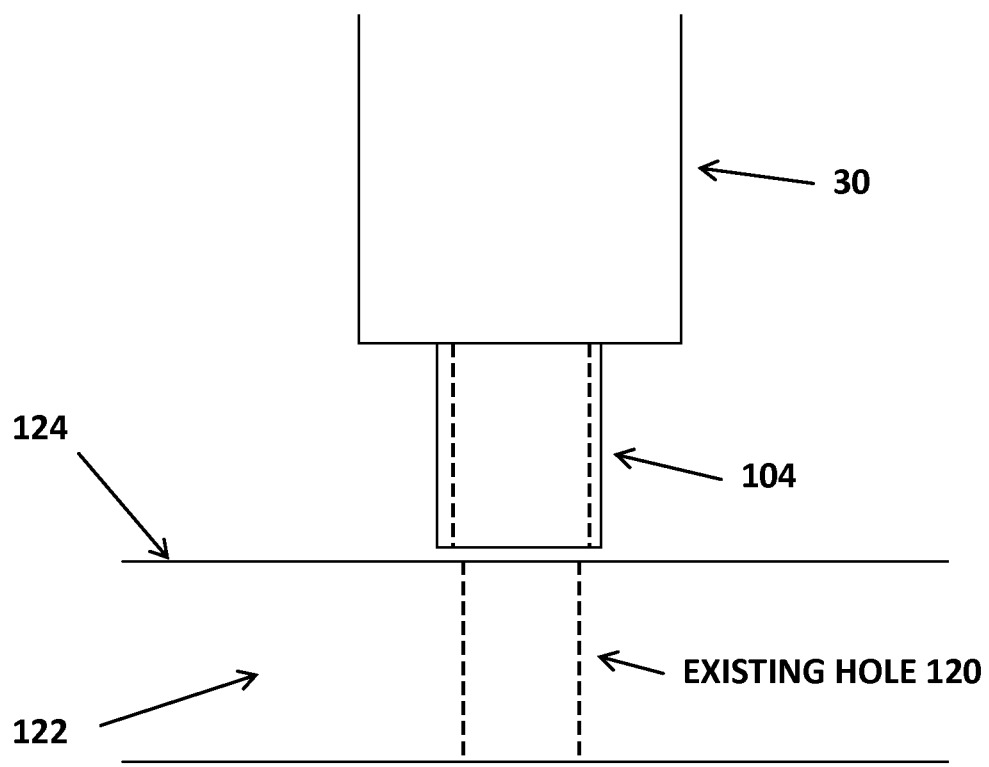
FIG. 8 is a profile view of a workpiece and a friction bit joining tool having a core cutting geometry that enables solid-state plug welding of the hole.

Other cutting features of the present invention that may be included in the bit 34 of the first embodiment include a core cutting geometry (as shown in FIG. 8) for making a hole into or through the workpieces, and a chip breaker.

Another aspect of the present invention expands upon the concept of using at least two different speeds for the bit 34; one speed for cutting, and another speed for creating a solid-state bond of the bit 34 to the workpiece. In the present invention, a single speed may be used, wherein the single speed may be sufficient for enabling cutting into the workpieces, and also for performing solid-state bonding at that same speed.

A feature of the prior art is that the materials used in the workpieces are all materials that may form a solid-state bond with the bit 34 when it is functioning as a rivet. In contrast, in another embodiment, the present invention teaches that there may be a plurality of different layers forming the workpieces.

Figure 6:
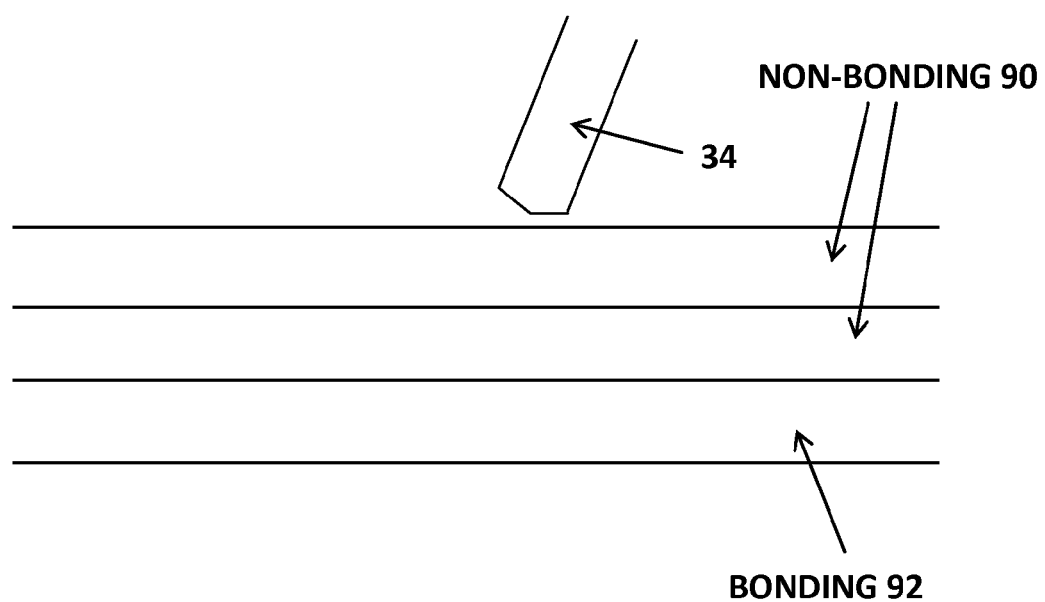
FIG. 6 is a profile view showing multiple layers of workpieces, where only the bottom workpiece may form a solid-state bond with the at least partially consumable bit.

FIG. 6 illustrates the new concept that in this embodiment there are one or more workpiece layers 90 that may not form a solid-state bond with the bit 34. However, what may be different is that only the bottom workpiece layer 92 needs to be a material that may form a solid-state bond with the bit 34. The bit 34 may cut through all the workpiece layers 90 above the bottom workpiece layer 92 in order to make the solid-state bond with the bottom workpiece layer.

In another embodiment, the workpiece layers 90 form a mechanical bond with the bit 34 and not a solid-state bond. In another embodiment, at least one workpiece layer 90 forms a mechanical bond while at least one other workpiece layer 90 forms a solid-state bond. The configuration of the workpiece layers 90, some of which may form a mechanical bond and some of which may form a solid-state bond, may be changed as needed depending upon the application. The workpiece layers 90 may be formed of materials with vary different properties, including non-metallic materials such as plastics and composites.

The next aspect of the present invention is directed towards how the friction bit joining tool 30 is stopped. One example in the prior art is shown in FIG. 4. Once the depth 56 of the hole 54 has extended into the second workpiece 52 as shown, the rotational speed of the friction bit joining tool 30 is slowed down to generate heat between the bit 34 and the first and second workpieces 50, 52 that are being joined together. A spindle (not shown) that is holding and rotating the friction bit joining tool 30 may either be immediately stopped or slowed down until the torque required to rotate the tool exceeds the shear strength of the smaller bit diameter portion 42. The smaller bit diameter portion 42 is designed to shear the detachable portion 38 of the bit 34 off of the friction bit joining tool 30 at a specified torque.

In contrast, the present invention teaches that rapid stopping of the friction bit joining tool 30 may cause problems for the motors that are driving the friction bit joining tool. In order to reduce wear on the motors, the present invention teaches a stopping cycle defined as the time that it takes for the friction bit joining tool 30 to go from a solid-state joining rotation rate to a complete stop. This embodiment includes slowing to a stop in less than 10 seconds, using a single-step stop time, using a multi-step stop time, using a variable RPM profile for the friction bit joining tool 30, and including a dwell time in the stop cycle. All these stopping cycles may reduce wear on the motors controlling rotation of the friction bit joining tool 30.

In another embodiment, the stopping cycle may be almost instantaneous through the use of a clutch on the motor. By using a clutch, the motor driving the spindle of the tool is free to slowly come to rest while the friction bit joining tool 30 may be stopped very rapidly, or as fast as less than one second.

In another embodiment of the present invention, instead of quickly stopping the rotation of the motors of the friction bit joining tool 30, a bit is used that has a specific taper bit shape. This taper bit may only allow the bit 34 to move down into the workpieces but not come back out. Thus it is only necessary for the friction bit joining tool 30 to release the bit 34 as soon as the solid-state bond is formed.

In another alternative embodiment, a quick release mechanism is provided between the bit 34 and the friction bit joining tool 30. The quick release mechanism may be spring-loaded in order to make the release of the bit 34 more rapid.

Another aspect of the present invention is directed towards providing a coating on at least a portion of a bit 34 for improved hardness. Improved hardness enables the bit 34 to penetrate harder workpieces. The coating may be any type that is known to those skilled in the art that will enable the bit 34 to cut into workpieces that are harder than the material used in the bit.

In a related embodiment, a coating may be disposed on at least a portion of a bit 34 that enables the bonding of the bit to the workpieces at a lower solid state bonding temperature than if the coating were not present. In another embodiment, a coating may be disposed on at least a portion of the bit 34 that will improve flow characteristics of the material in the workpiece around the bit.

In another embodiment, it may also be desirable to alter the flow characteristics of material in the workpieces during friction bit joining. Altering the flow characteristics may be achieved by reversing the rotational direction of a spindle that is rotating the friction bit joining tool 30 performing friction bit joining.

Another embodiment of the present invention is directed to providing a portable friction bit joining system. A portable friction bit joining system may range in size and weight from a large system that may be moved by a vehicle to various locations, down to a size and weight where the friction bit joining system may be operated by a single operator who is holding the system and supporting its' weight by the operator's own hands. A portable friction bit joining tool system may also rest on the ground, be a tabletop unit, or be handheld.

Another embodiment of the present invention is directed towards holding or fixturing various workpieces so that they may be joined. The present invention envisions using magnetic fixturing. In this embodiment, steel is used as a backup with an electromagnetic base to hold the workpieces in place. This magnetic fixturing method may be useful for friction bit joining aluminum and composites.

The friction bit joining tool 30 of the present invention may also be capable of join high melting temperature materials such as steel and stainless steel together during the solid state joining processes of friction stir welding. This technology may require using a friction stir welding tool 30 with unique properties. For example, the shoulder may be created using materials such as polycrystalline cubic boron nitride (PCBN) and polycrystalline diamond (PCD). Other materials that may be included are refractories such as tungsten, rhenium, iridium, titanium, molybdenum, etc.

The workpieces that may be joined using the principles of the present invention include materials that have melting temperatures higher than bronze and aluminum. This class of materials includes, but is not limited to, metal matrix composites, ferrous alloys such as steel and stainless steel, non-ferrous materials, superalloys, titanium, cobalt alloys typically used for hard-facing, and air hardened or high speed steels. Furthermore, the present invention may also be used on materials that are considered to be lower melting temperature materials that are not included within the definition of the higher melting temperatures described above.

The shoulder 32 of the friction bit joining tool 30 may be made from polycrystalline cubic boron nitride or similarly described materials that may prevent adhesion of the shoulder to the first workpiece 50 and provide superior thermal stability and wear resistance characteristics. Several shoulder configurations may be used to form the shape of the bit head or even cut away the bit head after the bit 34 has been friction welded into the workpieces 50, 52.

The materials used for the bit 34 are generally going to be those that may be consumed during the friction bit joining process. Such materials will preferably enhance the bond between the first and second workpiece materials, and are known to those skilled in the art of friction stir welding.

In another alternative embodiment, an important aspect of the present invention is creation of an automated friction bit joining system. An automated friction bit joining system may be used, for example, by a robotic friction bit joining system on an assembly line. For example, the assembly line may be used for constructing vehicles. The robotic friction bit joining system may include but is not limited to: an automated arm having the friction bit joining tool 30 on an end thereof; an automated movement system for moving the arm where the friction bit joining tool is to be used; an automated feeding system for supplying the friction bit joining tool with rivets; and an automated tracking system. These systems may also be operated manually.

The movement system must have at least one degree of freedom to allow the friction bit joining tool 30 to move forwards to cut and then insert a bit 34, and then backwards to allow insertion of another bit from the feeding system, if necessary.

Ideally the movement system provides at least two degrees of freedom so that the friction bit joining tool 30 may be moved to various locations along a temporarily stationary workpiece so that it may insert a plurality of bits 34 before the workpiece is moved away from the robotic arm.

The feeding system of the present invention may be automated, may also be manual. The feeding system may be able to supply bits 34 at a rate of at least one bit every five minutes, but preferably at a rate of one bit every few seconds as they are joined with the workpieces.

The feeding system may be capable of moving a bit 34 from a storage location to the friction bit joining tool 30. Various embodiments of feeding systems are envisioned for the present invention, including the use of a retractable drive system in a spindle of the friction bit joining tool 30, a magazine loading system, a chain feeding system, and a hopper/vibratory system for bit positioning. In another embodiment, the invention may also include the use of a second media such as tape for positioning and/or holding rivets in place, much like a nail gun, or even hand feeding rivets.

Figure 7:
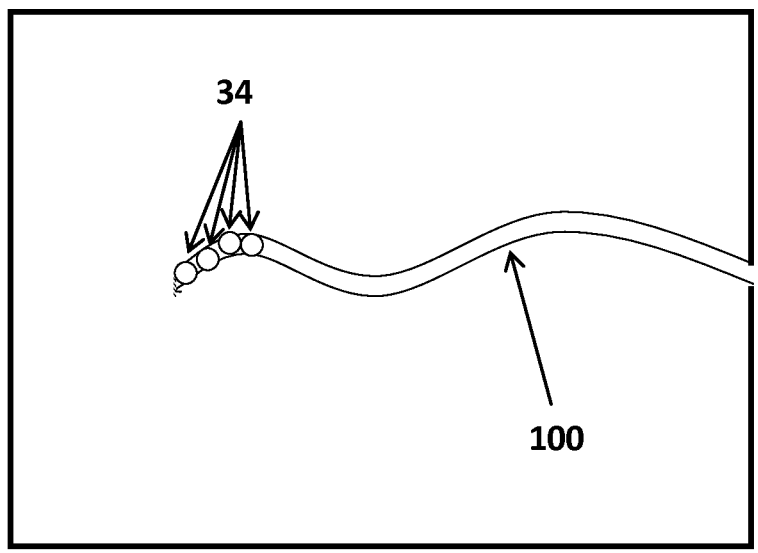
FIG. 7 is a top view of a workpiece with a crack, wherein metal stitching may be used to fill the crack with consumable bits.

An automated tracking system enables the robotic arm to move the tool 30 along a specific path. The path may not be a straight line. For example, as shown in FIG. 7, it may be desirable to perform metal stitching where a plurality of bits 34 are being placed along a crack 100 in order to repair it. Instead of using threaded mechanical plugs, the present invention uses bits 34 that are driven into the crack 100. The path of the crack 100 may either be pre-programmed into the movement system, or a visual scanning system may be coupled to an automated tracking system in order to follow the path of the crack and center each bit 34 before the bit is driven into the workpiece. The present invention may even be used to repair cracks in materials that are not traditionally weldable, such as cast iron.

Another embodiment is the use of the present invention to repair run-off holes 120 as shown in FIG. 8. When performing friction stir welding, a pin typically leaves behind a hole 120 when the tool is retracted. It is then necessary to plug the hole and finish the surface. In another embodiment, the present invention may be used to perform sold-state plug welding wherein a larger hole is cut into the workpiece 122 using a core cutting bit 104, preferably centered on the existing hole 120 that is being repaired. Thus, the present invention would use a bit 104 having a core cutting geometry. The bit may cut into the workpiece 122 to a depth such that a top surface of the bit is substantially flush with the surface 124 of the workpiece 122.

There are substantial benefits of using a consumable bit for the purpose of hole repair. These benefits include, but should not be considered limited to, elimination of oxidation on the workpiece, reducing stress risers on the workpiece, leaving behind a bit having a top surface that is at least as good as the material at the surface of the workpiece, if not better, and overall reduction of finishing costs.

In another alternative embodiment, inert gas such as argon or carbon dioxide may be caused to flow through the center of the tool 30 to prevent oxidation during friction bit joining.

In another alternative embodiment, more than two workpieces might be joined using the friction bit joining process of the present invention. The length of the segments of the bit 34 would therefore be adjusted accordingly.

In another alternative embodiment, it should be noted that the workpieces that are being joined may be the same or different materials, depending upon the application.

Similarly, the material used in the bit 34 may be a different material from all of the workpieces, the same material as at least one of the workpieces, or the same as the material on all the workpieces.

Bit profiles may be varied greatly. The bit profile may be a taper, hexagonal, or any desired shape that will perform both a cutting process and a friction bit joining process. The shape of the bit 34 will likely depend on various aspects, such as the desired bonding characteristics or the strength of the various materials being used.

In another embodiment, a friction bit joining tool 60 may have a hole 62 disposed through a central axis. The hole 62 allows a multi-segmented bit 64 (shown here with three segments separated by a smaller diameter pin portion 72) to be inserted and pushed through the hole 62 as needed. The multi-segmented bit 64 includes a plurality of gaps 66 having a smaller diameter pin portion 72. A plunger mechanism 68 may be used to push the multi-segmented bit 64 through the tool 60 and out a working end 70. As each segment of the multi-segmented bit 64 is broken off, the plunger mechanism 68 may push the multi-segmented bit down through the hole 62 until enough of the bit 64 is exposed for the next friction stir riveting process. In this way, multiple rivets may be inserted into work pieces without having to stop and reload a multi-segmented bit 64.

Figure 9:
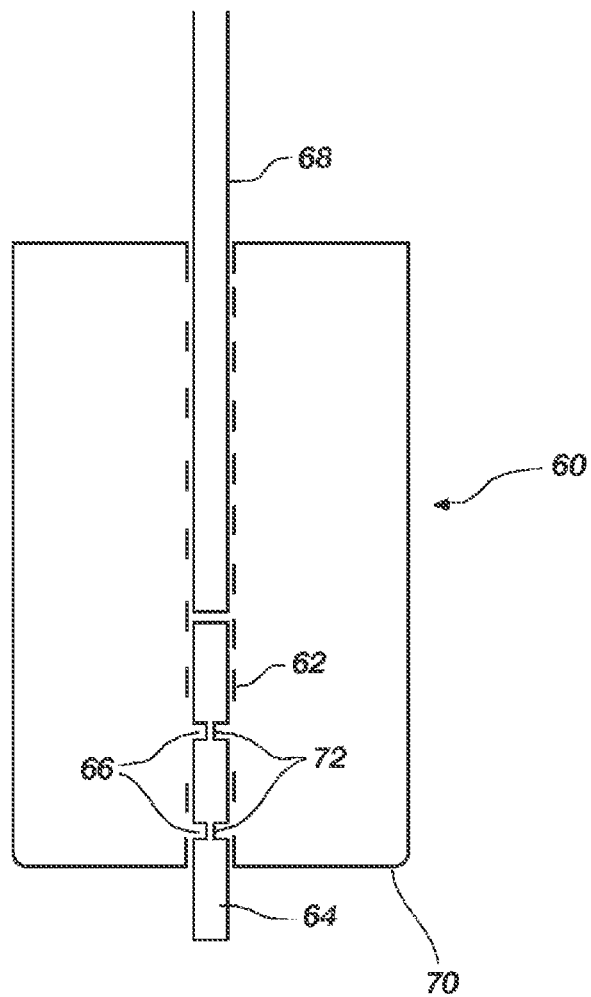
FIG. 9 is a profile cut-away view of a tool having a central hole for a multi-segmented bit for rapid friction bit joining.

The number of segments that may be used in a multi-segmented bit 64 should not be considered to be limited to three. FIG. 9 is for illustration purposes only. More segments may be disposed on the multi-segmented bit 64. The number of segments may also depend on the length of the tool 60 and the length of the plunger mechanism 68.

The bit 64 may be in rod or wire form and fed automatically through the center of the friction bit joining tool 60. When a square shape is used for the bit 64, this may allow torque from the friction bit joining tool 60 to be transmitted to the bit. However, other torque transmitting profiles may be used. Even a round shape may be used for the bit 64 as long as a clamping force or clamping mechanism on the outside diameter of the bit 64 is sufficient to keep the bit from slipping within the friction bit joining tool 60 when forces are applied.

It should be understood that a hole 62 may be disposed completely through the shank of the friction bit joining tool 60 to a non-consumable shoulder.

The bit 64 may have a variety of hardnesses or hardness profiles to facilitate workpiece penetration.

The friction bit joining tool 60 may run to a specified position or load value at RPMs ranging from 1 to 10,000 RPM.

The friction bit joining tool 60 may be run in the same configuration as fusion spot welding. For example, rather than using clamping with welding tips in a C clamp configuration, a small diameter rotating tool (FIG. 3) may be placed in a C clamp on the end of a robot arm. The C clamp configuration could also be used manually.

The bit 64 may have a fastener on the "head" so that a mechanical attachment may be used at that location. For example, the end of a bit 64 may have a threaded stub that is left to protrude above the workpieces after they have been joined. A nut may then be used to attach another component to the workpieces.

Some of the advantages of the friction bit joining process described in this document include, but should not be considered limited to, a solid state joining process that is rapid, low energy input process requirements, low residual stresses because of the solid state process, no predrilled hole is necessary as in conventional riveting, there is reduced or eliminated distortion of the workpieces, no hole is left in the workpieces as in FSSW, the process may be used in confined areas, Z-axis forces are comparable to current forces required to resistance spot weld, the shoulder/bit ratio may be sized to generate a specific heat profile to optimize joint strength, corrosion resistant bit materials may be used, because the process is completed at an elevated temperature the formation of the bit 34 has not yielded and will have greater energy absorption characteristics, the bit material may be overmatched to the workpiece material for greater strength, and the bit may be used at the tip of a crack to prevent further crack propagation in a workpiece.

It is generally the case that the bit 34 may be made using a material that is harder than the materials being joined. However, the bit 34 might be softer, but pushed with sufficient force and quickly enough; it may be used to join the harder workpiece materials. The bit 34 may also have a coating that allows penetration before the coating mechanically fails.

Another aspect of the invention is the option of removing the material being cut from the hole in the workpieces and being formed by the pin 34. One method of removing the material is to use a pecking motion. A pecking motion of the friction bit joining tool 30 may also be combined with a fluid flow to remove the material. The fluid may be compressible or non-compressible, including gas, air, mist, and water.

As previously mentioned, the present invention may be used to join different materials together, and is not limited to three body (two workpieces and a bit) configurations. Multiple layers of materials may be joined simultaneously. Any number of materials may be bonded so long as the materials are subjected to a temperature gradient that is less than the melting temperature of the materials being bonded.

In another embodiment of the present invention, the bit 34 may be comprised of various materials. The bit 34 may be manufactured using materials that provide different operating characteristics that may be useful in a single bit. Thus, the bit 34 may be of bi-, tri- or multi-material construction. Furthermore, the bit 34 may be manufactured having a hardness gradient relative to a cross-sectional view of the bit.

The range of surface travel speeds of the friction bit joining tool 30 may be considered to be from 0.1 mm per minute to 10 meters per minute. The rotational speed of the friction bit joining tool 30 may vary from 1 rpm to 100,000 rpm.

The friction bit joining tool 30 of the present invention may be a composite tool, such as a tool having a CBN shoulder, or different materials having a higher or lower modulus than the materials being bonded.

The hardness of the materials being bonded may be considered to include all materials on the Rockwell Scales A, B and C.

The cutting edge on the bit 34 of the present invention may have any suitable cutting geometry. Thus, any feature may be included on the bit 34 that enables cutting, cutting and heating, and heating with the intent of causing a bond. The bit 34 may also be threaded. Thus, the bit may not have a cutting geometry. An alternative embodiment uses heating of the bit 34 to enable creation of a hole or an aperture in or through other workpieces materials.

The present invention enables diffusion bonding on multiple planes, include axially and the sides of the hole that is created.

Figure 10:
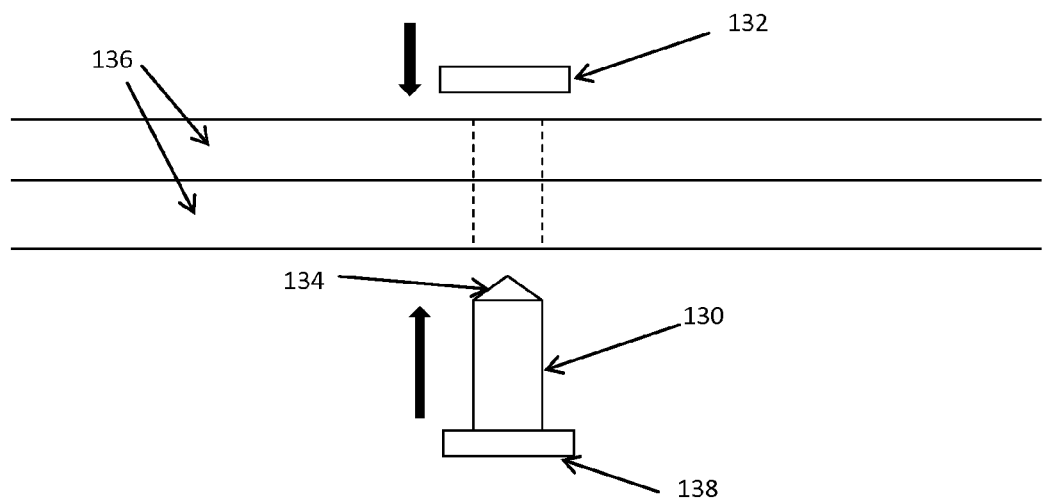
FIG. 10 is a profile view of a two piece friction rivet comprised of a friction rivet and a friction rivet cap.

FIG. 10 is a different embodiment of using friction rivet joining to join two materials together. Similar to FIG. 3 and FIG. 4, this embodiment may use a bit that functions as a friction rivet. FIG. 10 shows that this embodiment is comprised of a friction rivet 130 and a friction rivet head or friction rivet cap 132. The friction rivet 130 may include a cutting tip 134. The cutting tip 134 may cut through the workpieces 136 that are being joined using the friction rivet 130 and the friction rivet cap 132. The arrow next to the rivet 130 indicates the direction of movement of the friction rivet.

The friction rivet 130 may be coupled to a friction rivet joining tool at an attaching end 138. The friction rivet joining tool may rotate at a sufficient speed to enable the friction rivet 130 to cut through the workpieces 136, 138.

The friction rivet 130 may have an outer surface, not the cutting tip 134, having smooth sides or threaded sides. The sides may also be straight or curved. What is important to understand is that the friction rivet 130 may be bonded to the friction rivet cap 132. It should be understood that the threads may also be present on the friction rivet 130 even if the friction rivet cap 132 is not used.

Figure 11:
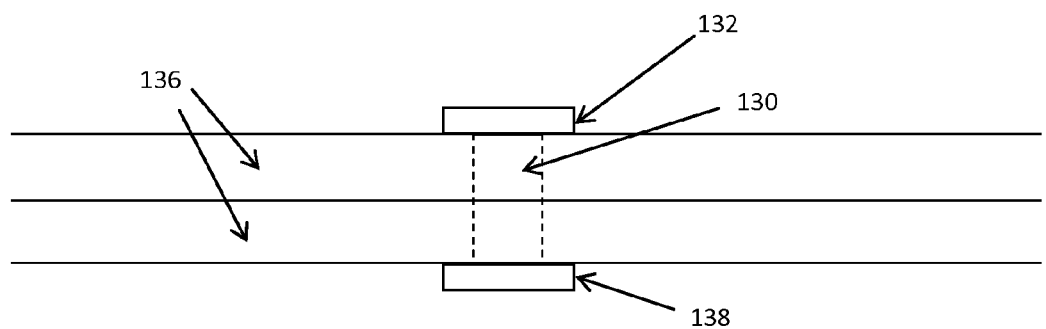
FIG. 11 is a profile view of the friction rivet coupled to the friction rivet cap after the friction rivet cut through the workpieces.

FIG. 11 shows that after the friction rivet 130 has cut through the workpieces 160, the friction rivet is bonded to the friction rivet cap 132. The friction rivet cap 132 may be held against the workpieces 136 by another object. The friction rivet 130 and the friction rivet cap 132 may be manufactured from the same or different materials. The friction rivet 130 may or may not have to cut into the friction rivet 132 in order to be bonded together. The speed necessary for bonding the friction rivet 130 to the friction rivet cap 132 may or may not be different from the speed used to cut through the workpieces 136.

After the friction rivet 130 is bonded to the friction rivet cap 132, the friction rivet joining tool releases the friction rivet. The friction rivet joining tool may be attached to the friction rivet 130 using any convenient means know to those skilled in the art, and should not be considered a novel aspect of this embodiment.

Figure 12:
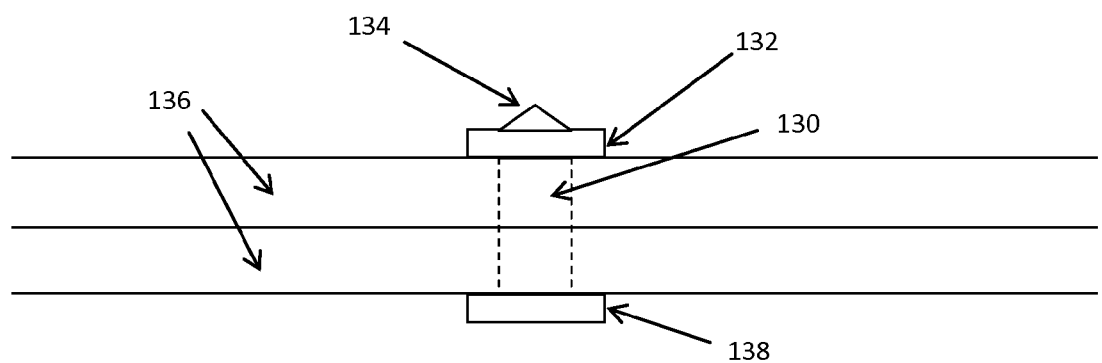
FIG. 12 is a profile view of a different embodiment where the friction rivet is long enough to pass through the friction rivet cap.

FIG. 12 is another embodiment of the present invention. This embodiment is similar to the embodiment shown in FIGS. 10 and 11. However, instead of stopping short of penetrating the friction rivet cap 132, the friction rivet 130 may extend through the friction rivet cap 132, thereby at least partially exposing the cutting tip 134.

Another difference of the embodiment in FIG. 12 is that the friction rivet 130 may or may not cut through the friction rivet cap 132. Therefore, a hole may or may not be pre-cut through the friction rivet cap 132.

Figure 13:
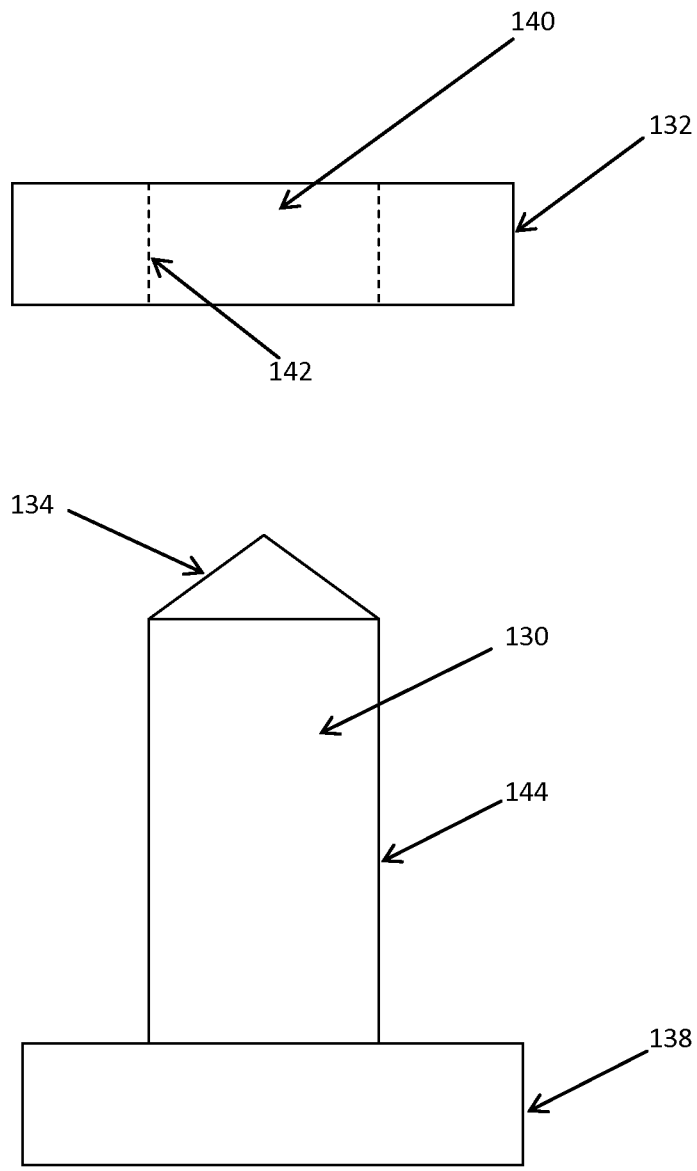
FIG. 13 is a close-up view of a friction rivet having threads along the outside surface of the walls of the friction rivet, and a friction rivet cap that has corresponding threads on the inside surface.

In an alternative embodiment shown in FIG. 13 where the hole 140 is pre-cut through the friction rivet cap 132, the inner surface 142 of the hole 140 may be threaded. The threaded inner surface 142 may correspond to threads 144 on an outer surface of the friction rivet 130. The threaded outer surface 144 of the friction rivet 130 and the threaded inner surface 142 of the friction rivet cap 132 may decrease the time to bond the friction rivet to the friction rivet cap. The threaded outer surface 144 of the friction rivet 130 and the threaded inner surface 142 of the friction rivet cap 132 may also enable the friction rivet to be bolted and bonded to the friction rivet cap.

Figure 14:
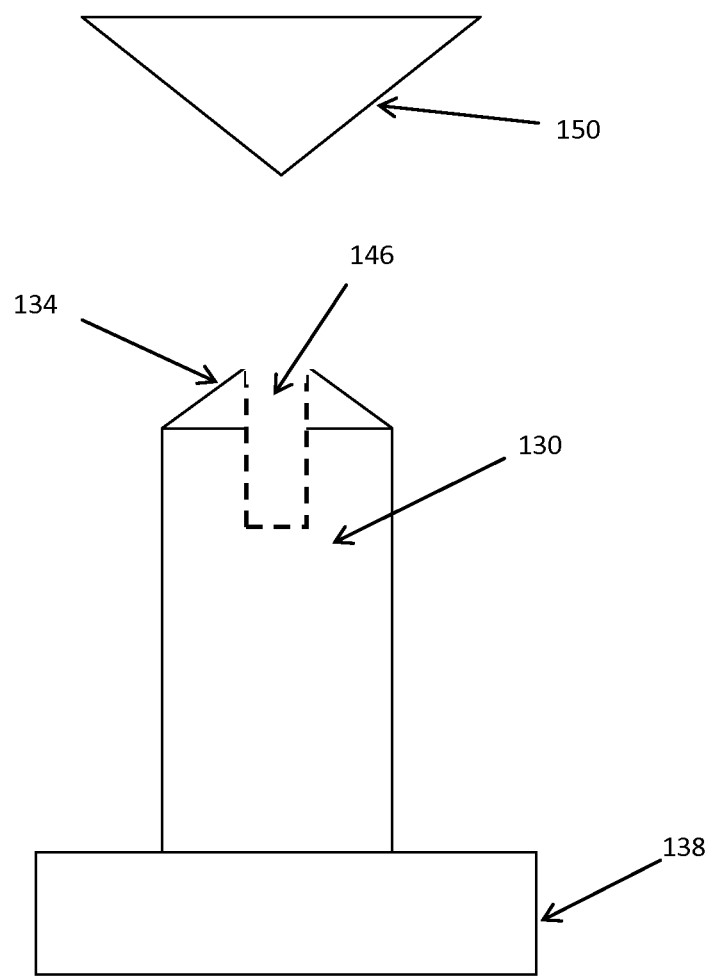
FIG. 14 is a close-up view of a friction rivet having a hollow in the top of the friction rivet that allows a flaring tool to flare the top of the friction rivet after penetrating the workpieces, creating an integral rivet cap.

FIG. 14 is another embodiment of the present invention that does not use a friction rivet cap. In this embodiment the cutting tip 134 is modified to include a hollow 146 or a hole that only extends partway into the friction rivet 130. The hollow 146 may only extend into the cutting tip 134, or it may extend deeper into the friction rivet 130.

The purpose of the hollow 146 is to enable the cutting tip 134 to cut through the workpieces 136 and then a flaring tool 150 is pressed against the friction rivet 130 which may cause the end of the friction rivet to flare outwards to create an integral rivet head 148. The shape of the flaring tool 150 is for illustration purposes only and should not be considered as limiting the shape or size of the actual flaring tools that may be used.

Figure 15:
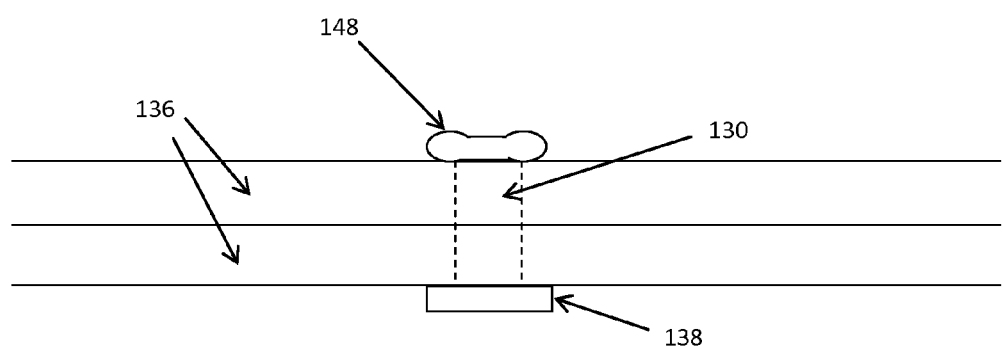
FIG. 15 is a profile view of a friction rivet after the flaring tool has been used to create the integral rivet cap.

FIG. 15 is an illustration of the integral rivet head 148 created on top of the friction rivet 130 by the flaring tool 150. The length of the friction rivet 130 is chosen to be long enough to enable the integral rivet head 148 to be formed.

The flaring tool 150 may be a stand-alone tool or it may be a flaring shape disposed on a surface that is on the opposite side of the workpieces 136.

When the flaring tool 150 makes contact with the friction rivet 130 and forms the integral rivet head 148, the integral rivet head may or may not be bonded to the workpieces 136.

Figure 16:
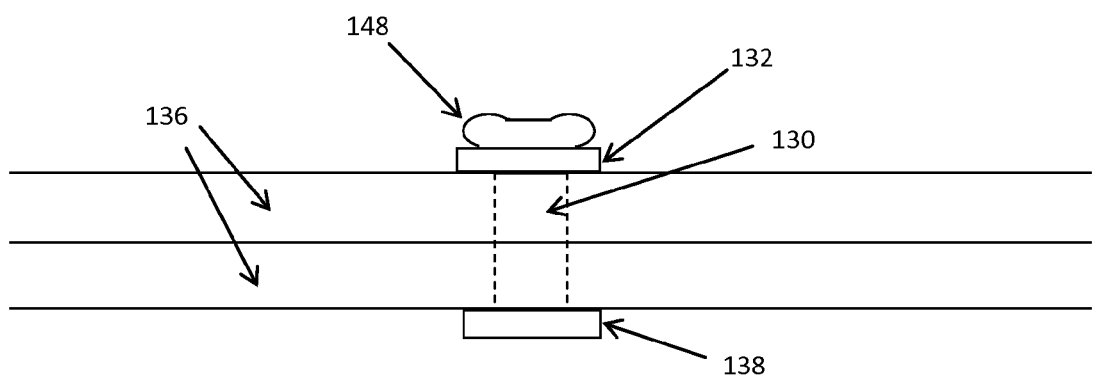
FIG. 16 is alternative embodiment of FIG. 15 wherein the friction rivet cap of FIG. 13 is used in combination with the flaring tool to create an integral rivet cap that is mechanically holding the friction rivet cap in place.

In an alternative embodiment, the friction rivet cap 152 is still used as shown in FIG. 16. In FIG. 16, the friction rivet cap 132 is used, and the flaring of the friction rivet 130 may cause a mechanical interference which holds the friction rivet cap in place. One result of the embodiment of FIG. 16 is that a residual stress may be created in the friction rivet 130.

FIGS. 10 through 16 illustrate a cutting tip 136 on the friction rivet 130 that enable cutting through the workpieces 136. The cutting tip may not have to cut through the workpieces 136 if a hole is pre-cut. Furthermore, the friction rivet 130 may not need a cutting tip if the hole through the workpieces is pre-cut. However, the cutting tip 134 may still be needed, depending on the method selected for capping the friction rivet.

In another alternative embodiment, a plurality of friction rivets 130 may be connected together to make a multi-segmented rivet similar to what is shown in FIG. 9. Thus, a friction bit rivet tool may have a hole disposed through a central axis. The hole may allow a multi-segmented rivet to be inserted and pushed through the hole as needed. The multi-segmented rivet may include a plurality of gaps having a smaller diameter pin portion. A plunger mechanism may be used to push the multi-segmented rivet through the friction rivet joining tool and out a working end. As each segment of the multi-segmented rivet is broken off, the plunger mechanism may push the multi-segmented rivet down through the hole until enough of the rivet is exposed for the next friction stir riveting process. In this way, multiple rivets may be inserted into work pieces without having to stop and reload a multi-segmented rivet.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A joint system for joining at least two workpieces using a friction rivet, said joint system comprised of:
    a first workpiece and a second workpiece, the first workpiece including a first metallic material and the second workpiece including a second metallic material, wherein the first workpiece is adjacent to and contacting the second workpiece;
    a friction rivet joining tool having an attaching end and a shoulder, the shoulder configured to at least partially contact the first metallic material, the friction rivet joining tool being configured to rotate the attaching end, the friction rivet joining tool having a variable rotation speed, the variable rotation speed configured to selectively increase or decrease a rotation speed of the attaching end;
    a friction rivet that is held by the friction rivet joining tool at the attaching end, wherein the friction rivet includes a cutting tip configured to cut through the first workpiece and the second workpiece, wherein the friction rivet is joined to the first workpiece and the second workpiece at least in part as a result of friction heating and plasticization of at least one of the friction rivet, the first metallic material or the second metallic material, the friction heating and plasticization incurred by applied pressure and rotation of the friction rivet on the first metallic material and the second metallic material; and
    a friction rivet cap attached to the friction rivet, the cutting tip passing through the friction rivet cap after passing through the first metallic material and the second metallic material.

2. The joint system as defined in claim 1 wherein the friction rivet has a threaded outer surface.

3. The joint system as defined in claim 1 wherein the joint system is further comprised of a hollow disposed in the cutting tip of the friction rivet.

4. The joint system as defined in claim 3 wherein the joint system is further comprised of a flaring tool for flaring the friction rivet at the hollow, to thereby cause an end of the friction rivet to flare outwards to create an integral rivet head, the integral rivet head forming at least in part a mechanical interface used to hold the friction rivet and friction rivet cap in place, the integral rivet head at least partially metallurgically bonded to the friction rivet cap.

5. A joint system for joining at least two workpieces using a friction rivet, said joint system comprised of:
    a first workpiece and a second workpiece, the first workpiece including a first metallic material and the second workpiece including a second metallic material;
    a friction rivet joining tool having an attaching end and a shoulder, the shoulder configured to at least partially contact the first metallic material, the friction rivet joining tool being configured to rotate the attaching end, the friction rivet joining tool having a variable rotation speed, the variable rotation speed configured to selectively increase or decrease a rotation speed of the attaching end;
    a friction rivet including a cutting tip and a hollow disposed in the cutting tip, wherein the cutting tip is configured to cut the first workpiece and the second workpiece by the cutting tip and becomes flared following cutting of the first workpiece and the second workpiece, wherein the friction rivet is joined to the first workpiece and the second workpiece at least in part as a result of friction heating and plasticization of at least one of the friction rivet, the first metallic material or the second metallic material, the friction heating and plasticization incurred by applied pressure and rotation of the friction rivet on the first metallic material and the second metallic material;
    a friction rivet cap attached to the friction rivet, the friction rivet passing at least partially through the friction rivet cap; and
    an integral rivet head formed by flaring the cutting tip of the friction rivet following cutting of the first metallic workpiece and the second metallic workpiece to hold the friction rivet in place.

6. The joint system as defined in claim 5 wherein the joint system is further comprised of a threaded outer surface on the friction rivet.

7. The joint system as defined in claim 5 wherein the joint system is further comprised of a pre-cut hole disposed through the at least two workpieces.

8. The joint system as defined in claim 2, wherein the friction rivet cap includes a threaded inner surface.

9. A joint system for joining at least two workpieces using a friction rivet, said joint system comprised of:
    a friction rivet including a cutting tip and a hollow disposed in the cutting tip, wherein the cutting tip is configured to cut through a first metallic workpiece and a second metallic workpiece, the hollow longitudinally extending through the cutting tip and at least partway into the friction rivet, the hollow facilitating cutting of the first metallic workpiece and the second metallic workpiece; and a friction rivet cap configured to receive and join to the friction rivet, the friction rivet cap is configured to contact the second metallic workpiece on an opposite side of the second metallic workpiece from the first metallic workpiece and from a surface of the second metallic workpiece through which the cutting tip of the friction rivet cuts, the friction rivet cap having a pre-cut hole extending therethrough wherein at least a portion of the cutting tip of the friction rivet extends through the friction rivet cap and from the second metallic workpiece when joined to the friction rivet.

10. The joint system as defined in claim 9, wherein the friction rivet is a portion of a multi-segmented friction rivet.

11. The joint system as defined in claim 9, wherein an outer surface of the friction rivet has planar sides.

12. The joint system as defined in claim 9, wherein the friction rivet and friction rivet cap comprise different materials.

13. The joint system as defined in claim 9, wherein an inner surface of the pre-cut hole is threaded.

14. The joint system as defined in claim 9, wherein an outer surface of the friction rivet is threaded.

15. The joint system as defined in claim 9, wherein both an inner surface of the pre-cut hole and an outer surface of the friction rivet are threaded.

16. The joint system as defined in claim 1, wherein the friction rivet cap includes a pre-cut hole and an inner surface of the pre-cut hole is threaded.

17. The joint system as defined in claim 1, wherein the friction rivet is part of a plurality of friction rivets, connected together lengthwise to form a multi-segmented bit.

18. The joint system as defined in claim 1, wherein the friction rivet and friction rivet cap comprises the same material to enable diffusion bonding therebetween.

19. The joint system as defined in claim 1, wherein at least a portion of the cutting tip is exposed.

* * * * *